(12) United States Patent
Parks

(10) Patent No.: US 7,597,166 B2
(45) Date of Patent: Oct. 6, 2009

(54) HINGE DEVICE FOR PEDESTRIAN PROTECTION SYSTEM

(75) Inventor: Brent Parks, Englewood, CO (US)

(73) Assignee: Autoliv ASP, Inc., Ogden, CT (US)

( * ) Notice: Subject to any disclaimer, the term of this patent is extended or adjusted under 35 U.S.C. 154(b) by 497 days.

(21) Appl. No.: 11/407,481

(22) Filed: Apr. 20, 2006

(65) Prior Publication Data

US 2007/0246281 A1 Oct. 25, 2007

(51) Int. Cl.
*B62D 25/12* (2006.01)
*B62D 25/10* (2006.01)
*B60K 28/10* (2006.01)
*B60T 7/12* (2006.01)
*B60T 7/22* (2006.01)

(52) U.S. Cl. .................. 180/69.2; 180/69.21; 180/274; 180/89.17; 296/193.11; 296/187.04

(58) Field of Classification Search ................ 280/69.2, 280/69.21, 274, 89.17; 296/193.11, 187.04; 180/69.2, 69.21, 274, 89.17

See application file for complete search history.

(56) References Cited

U.S. PATENT DOCUMENTS

| 6,182,782 | B1 | 2/2001 | Matsuura et al. | |
|---|---|---|---|---|
| 6,345,679 | B1 | 2/2002 | Sasaki | |
| 6,415,882 | B1* | 7/2002 | Schuster et al. | 180/69.21 |
| 6,439,330 | B1 | 8/2002 | Paye | |
| 6,513,617 | B2 | 2/2003 | Sasaki et al. | |
| 6,520,276 | B2 | 2/2003 | Sasaki et al. | |
| 6,530,449 | B2 | 3/2003 | Sasaki et al. | |
| 6,554,093 | B2* | 4/2003 | Sasaki et al. | 180/274 |
| 6,571,901 | B2 | 6/2003 | Lee | |
| 6,622,541 | B2 | 9/2003 | Stein et al. | 73/12.04 |
| 6,907,817 | B2 | 6/2005 | Parks | |
| 7,303,040 | B2* | 12/2007 | Green et al. | 180/274 |
| 2002/0011365 | A1 | 1/2002 | Sasaki et al. | |
| 2002/0011371 | A1 | 1/2002 | Sasaki et al. | |
| 2002/0011372 | A1 | 1/2002 | Sasaki et al. | |
| 2002/0014367 | A1* | 2/2002 | Sasaki et al. | 180/274 |
| 2002/0043418 | A1 | 4/2002 | Lee | |
| 2006/0131086 | A1* | 6/2006 | Lutter et al. | 180/69.21 |
| 2006/0151221 | A1* | 7/2006 | Kalliske et al. | 180/69.2 |
| 2006/0213709 | A1* | 9/2006 | Yamaguchi et al. | 180/69.21 |
| 2006/0255580 | A1 | 11/2006 | Enders et al. | |
| 2007/0151791 | A1* | 7/2007 | Gust | 180/274 |

FOREIGN PATENT DOCUMENTS

DE 101 28 9 67 6/2001
WO WO 2004/094204 11/2004

* cited by examiner

*Primary Examiner*—Christopher P Ellis
*Assistant Examiner*—John R Olszewski
(74) *Attorney, Agent, or Firm*—Sally Brown; Stoel Rives LLP

(57) ABSTRACT

Disclosed are embodiments of hinge devices for use in hood lifting systems for pedestrian protection. An exemplary embodiment of such a hinge device includes an upper hinge portion configured to be connected with a vehicle hood and a lower hinge portion configured to be connected with a vehicle body. The upper hinge portion may be configured to releasably engage the lower hinge portion such that the upper hinge portion can disengage from the lower hinge portion and lift the vehicle hood upon a threshold separation force being applied to the hinge device.

18 Claims, 8 Drawing Sheets

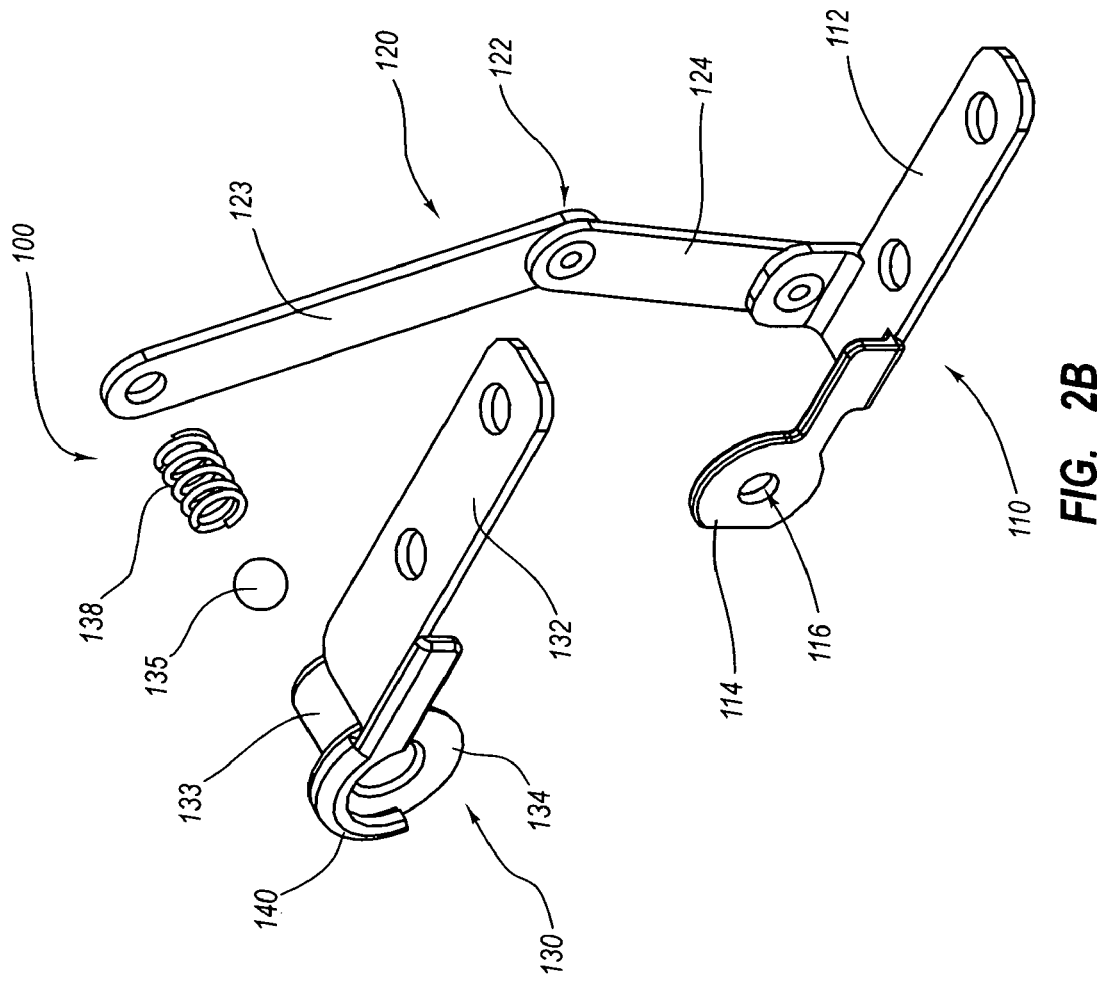
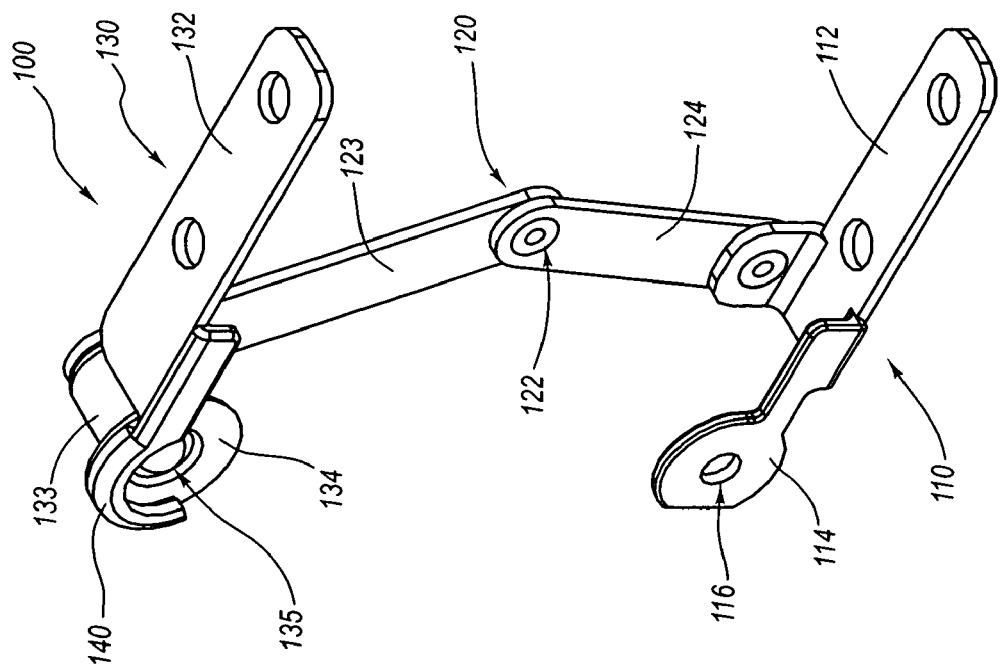

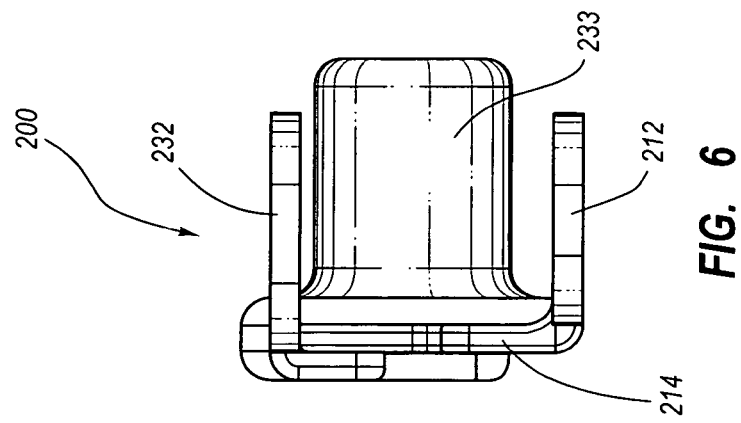
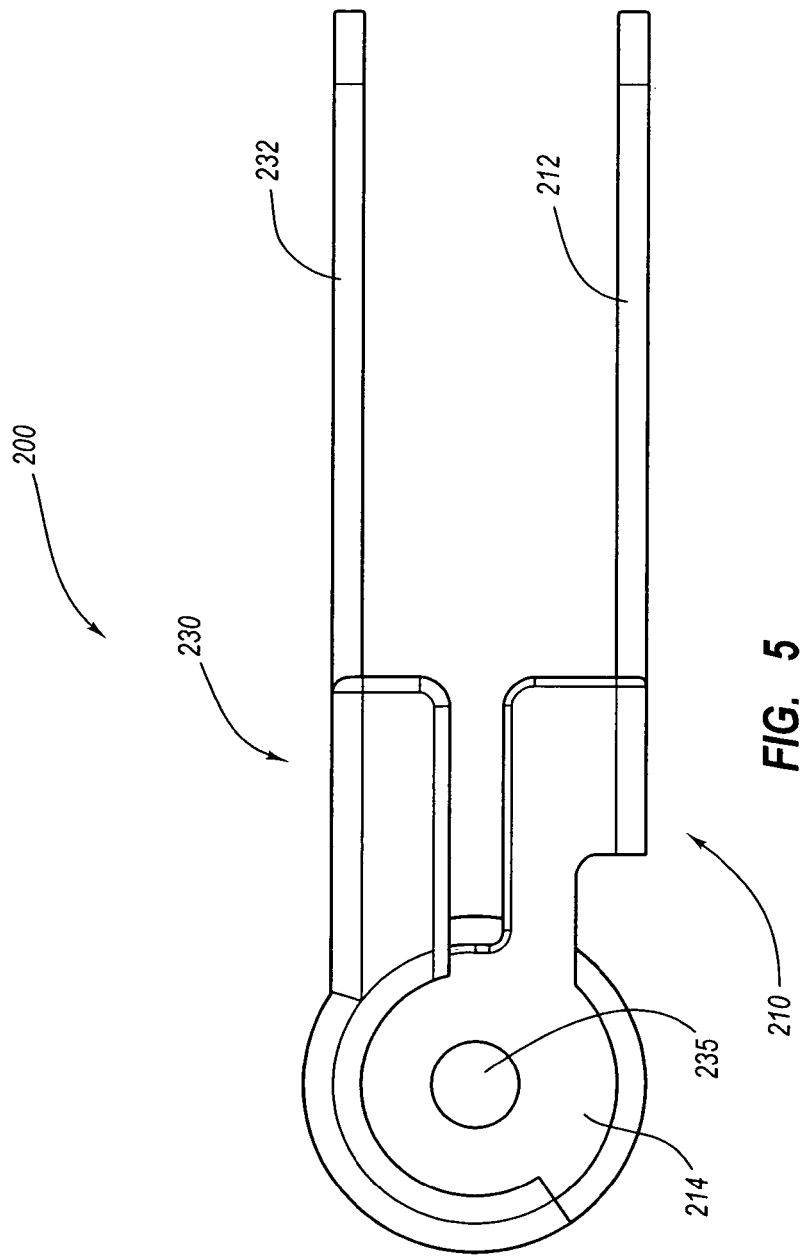

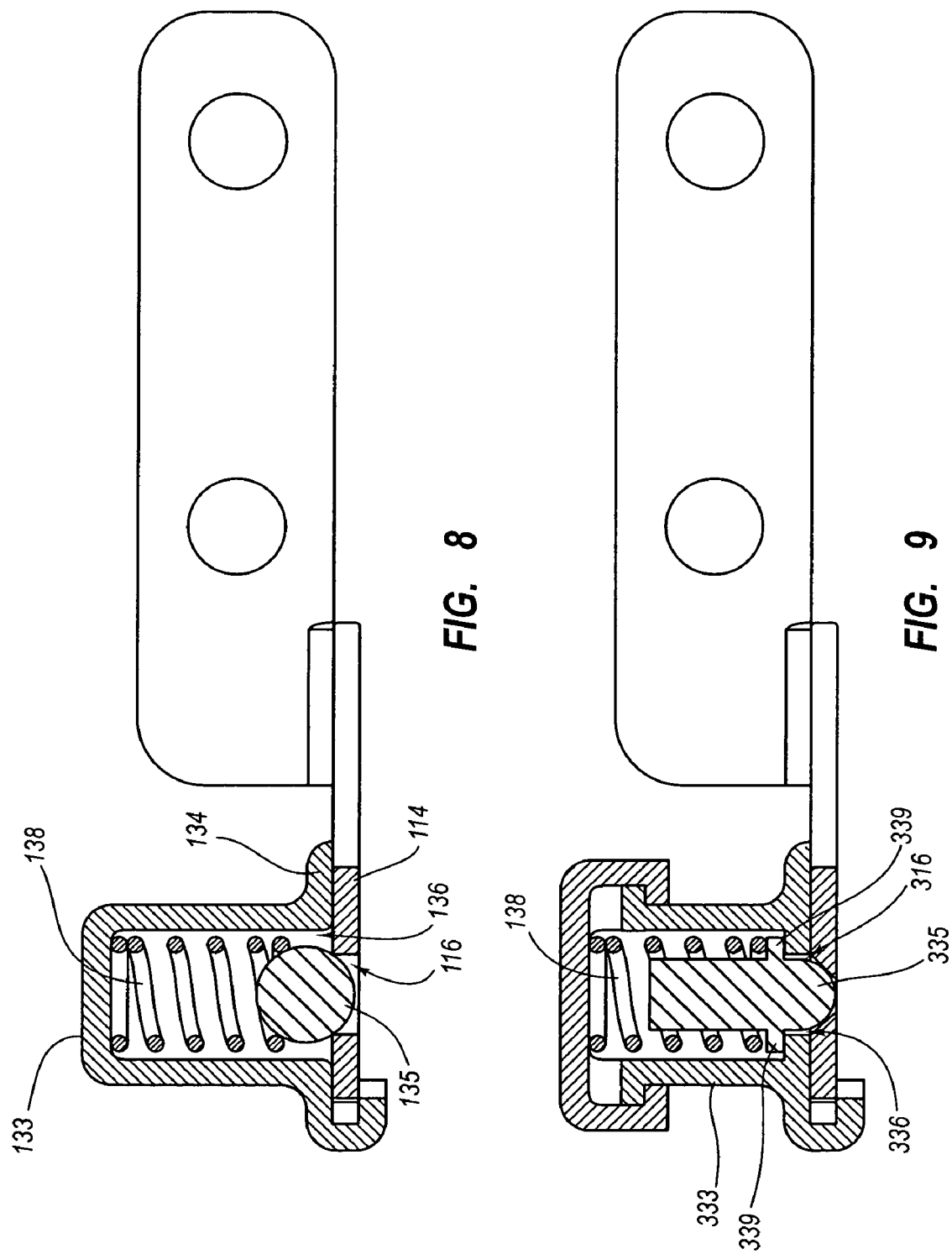

HINGE DEVICE FOR PEDESTRIAN PROTECTION SYSTEM

TECHNICAL FIELD

The present invention relates generally to the field of automotive protective systems. More specifically, the present invention relates to pedestrian protective systems.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 2A is a perspective view of an embodiment of a hinge device for use in a pedestrian protection system.

FIG. 2B is an exploded view of the hinge device shown in FIG. 2A.

FIG. 5 is a side elevation view of the hinge device depicted in FIG. 4.

FIG. 6 is an end elevation view of the hinge device depicted in FIGS. 4-5.

FIG. 8 is a cross-sectional view showing a resilient protruding member of an embodiment of a hinge device.

FIG. 9 is a cross-sectional view showing a resilient protruding member of another embodiment of a hinge device.

DETAILED DESCRIPTION OF PREFERRED EMBODIMENTS

Described below are illustrative embodiments of hinge devices for use in hood lifting systems for pedestrian protection. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, the hinge device includes an upper hinge portion configured to be connected with a vehicle hood and a lower hinge portion configured to be connected with a vehicle body. The upper hinge portion may be configured to releasably engage the lower hinge portion such that the upper hinge portion can disengage from the lower hinge portion and lift the vehicle hood upon a threshold separation force being applied to the hinge device.

Various embodiments of the invention may be used in connection with an actuator configured to lift a portion of a vehicle hood upon deployment in response to, for example, the vehicle coming into contact with a pedestrian. Such an actuator may be used to provide a separation force between the upper and lower portions of the hinge device to allow the two portions to release from one another and thereby allow the hood to be lifted. In one particular embodiment, the hinge device may have a spring-loaded pin or other similar device in the upper portion, for example, which is configured to be received in an opening in the lower portion. Of course, in other embodiments the pin may be in the lower portion and the opening in the upper portion. The shearing force of the actuator may be used to cause the spring-loaded pin to recede from the opening and allow the two portions of the device to be separated, thereby allowing the hood to be lifted by the actuator.

In some embodiments, the hinge device may be resettable such that, upon being disengaged from the lower hinge portion, the upper hinge portion can be re-engaged with the lower hinge portion to allow the hinge device to be reused to lift and lower the vehicle hood on a plurality of instances. In the aforementioned embodiment having a spring-loaded pin, the pin may be re-inserted into the opening by, for example, forcing the hood down, manually or by use of the actuator, and thereby forcing the pin to extend into the opening to lock the two portions together again. This feature may be used, for example, in the event of an inadvertent deployment of the system.

Figure 1B:
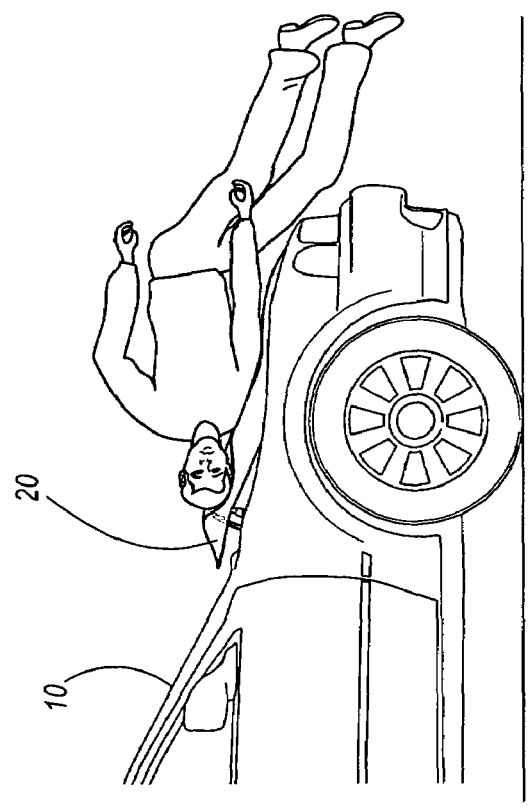
FIGS. 1A and 1B depict a vehicle hood being raised in response to the vehicle striking a pedestrian.
Figure 1A:
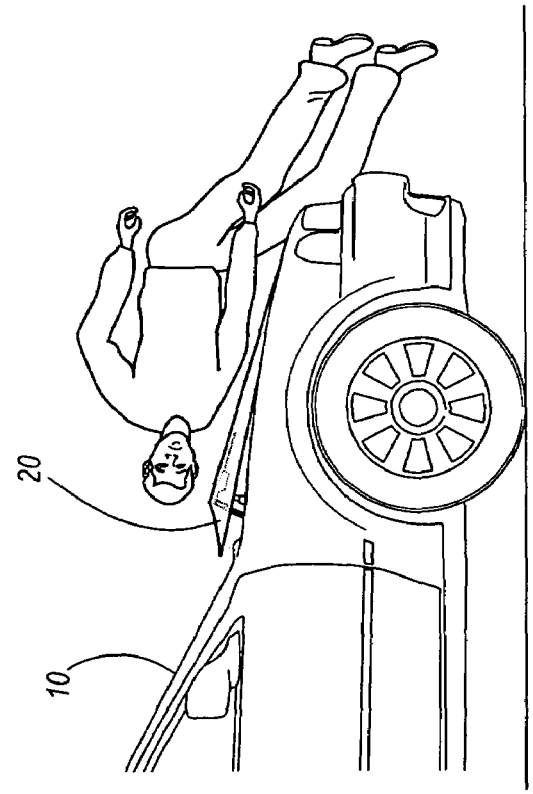

With reference now to the accompanying figures, various exemplary embodiments of the invention will now be described in greater detail. FIGS. 1A and 1B depict a pedestrian/automobile accident in which the rear portion (the portion closest to the vehicle's windshield 10) of the vehicle's hood 20 has been lifted to provide additional room between the hood 20 and the engine compartment for absorbing collision energy and thereby reducing the injuries likely to be sustained by the pedestrian.

Figure 3:
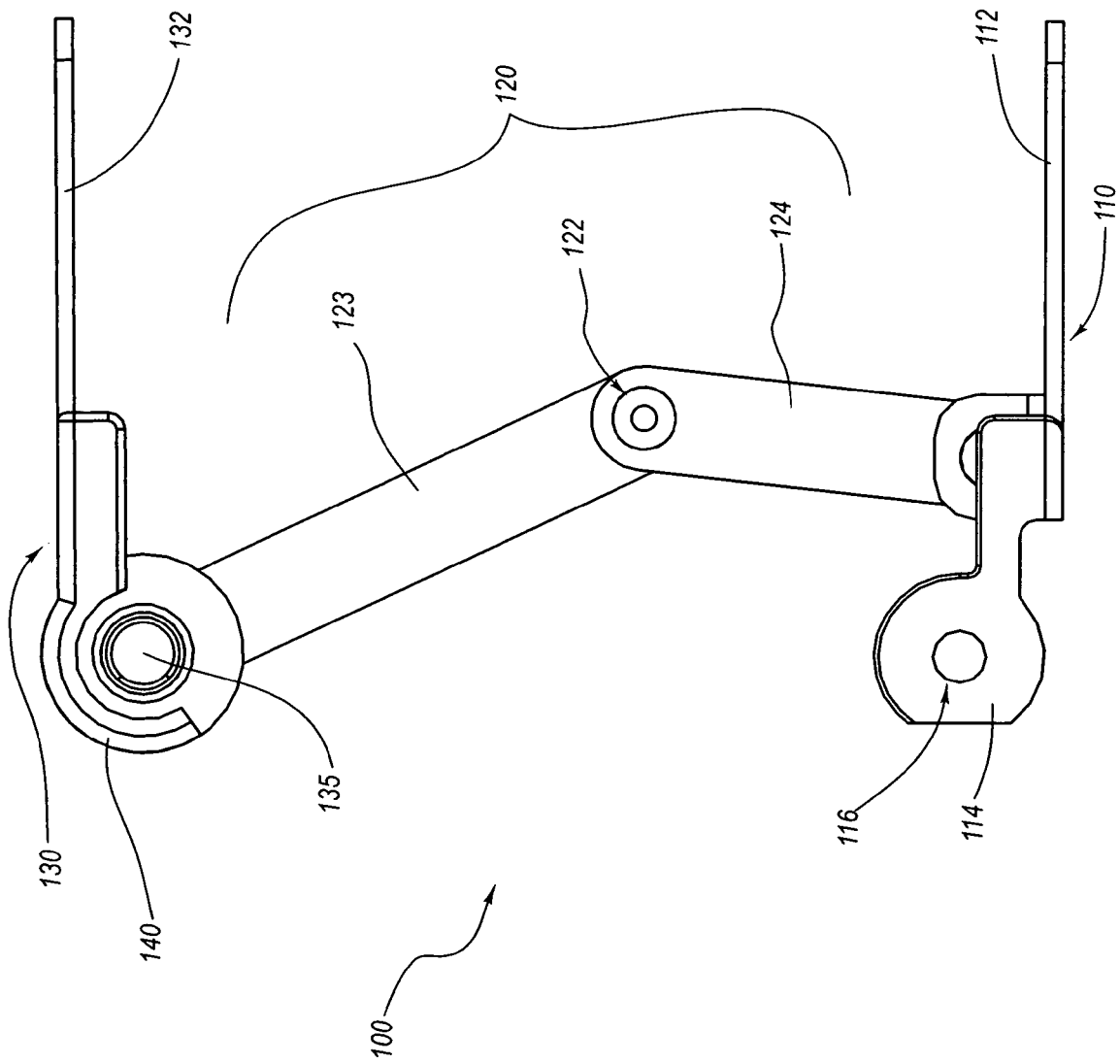
FIG. 3 is a side elevation view of the hinge device shown in FIGS. 2A and 2B.

FIGS. 2A, 2B and 3 depict an embodiment of a hinge device 100 that may be used in conjunction with hood-lifting systems that function similar to the system generally shown in FIGS. 1A and 1B. Hinge device 100 includes a lower portion 110 and an upper portion 130. The lower and upper portions—110 and 130, respectively—of the device 100 may be, in some embodiments, connected with a connecting portion, such as connecting portion 120 shown in the aforementioned figures.

Figure 7:
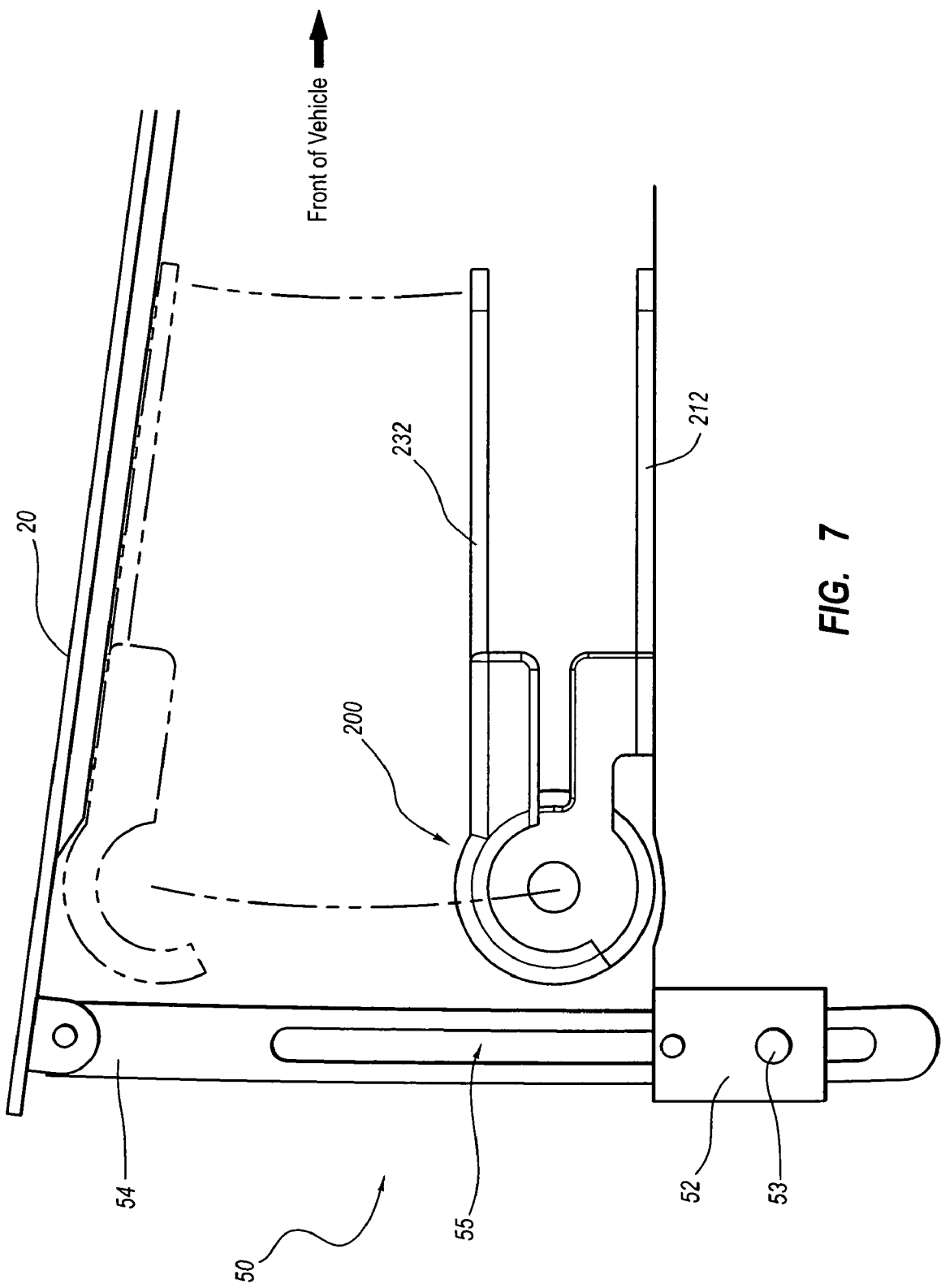
FIG. 7 is a side elevation view of the hinge device depicted in FIGS. 4-6 shown operating in conjunction with a hood guide to lift a vehicle hood.

Connecting portion 120 includes an upper connecting portion arm 123 and a lower connecting portion arm 124. Upper connecting portion arm 123 is attached to upper portion 130 and lower connecting portion arm 124 is attached to lower portion 110. Connecting portion 120 is itself hinged at hinge 122 between the upper connecting portion arm 123 and the lower connecting portion arm 124 to allow the upper portion 130 to be moved apart from, and yet remain connected with, the lower portion 110. Those having ordinary skill in the art and the benefit of the present disclosure will appreciate that the connecting portion 120 may vary or be replaced with a variety of other similar components. In some embodiments, a connecting portion need not be provided at all, such as in hinge device 200 shown in FIGS. 4-6. Alternatively, a similar device attached to the vehicle itself may be used in place of a connecting portion, such as is shown in FIG. 7.

With reference again to FIGS. 2A-3, it can be seen that lower portion 110 includes a horizontal plate 112 and a vertical plate 114. In the depicted embodiment, horizontal plate 112 and vertical plate 114 are shown as integrally attached to one another. In other words, lower portion 110 is a unitary piece. However, this need not be the case. Other embodiments are contemplated in which the vertical plate is attached or otherwise connected—but not integrally connected—with the horizontal plate. Still other embodiments are contemplated in which the plates are replaced with other structures performing substantially similar functions. The present disclosure will suggest a wide variety of alternative structures to those having ordinary skill in the art.

Horizontal plate 112 may be attached to the body of a vehicle. Vertical plate 114, which extends from horizontal plate 112, has an opening 116 formed therein. It can be seen from the referenced figures that opening 116 extends all the way through a plate 114. It should be appreciated, however, that similar embodiments are contemplated in which the opening instead comprises a depression or other such opening that does not extend all the way through any part of the lower portion of the device. Opening 116 is configured to receive a resilient protruding member, such as ball bearing 135, which is connected with the upper portion 130, to thereby engage the upper portion 130 with the lower portion 110, as described in greater detail below. For embodiments in which the opening comprises a depression, groove, or the like, the ball bearing may still be engaged with the opening to connect the upper and lower portions of the device.

Upper portion 130 includes a horizontal plate 132 that may be attached to a vehicle hood. Upper portion also includes a housing 133, which is configured to house the ball bearing 135. Ball bearing 135 operates in conjunction with a spring 138. However a variety of similar devices could be used in place of a ball bearing/spring, such as a spring-loaded pin, or other devices capable of being biased towards an opening to engage two pieces together and being backed out of the opening upon receipt of a separation or shearing force between the two pieces. A variety of such devices will be apparent to one having ordinary skill in the art with the benefit of the present disclosure. Any of the aforementioned structures/devices should be considered resilient protruding members.

Upper portion 130 also includes a vertical plate 134. Vertical plate 134 has an opening 136 through which ball bearing 135 can extend. In the absence of external forces, ball bearing 135 extends at least partially beyond the peripheral plane created by vertical plate 134, as best seen in the cross-sectional view of FIG. 8. In the depicted embodiment, this is due to the biasing force of a spring. In FIG. 8, it can be seen that ball bearing 135 is biased partially through opening 136, and partially through opening 116, by the force of spring 138.

When biased in the direction towards spring 138 (or away from opening 136), ball bearing 135 may be recessed within housing 133, such that it no longer extends beyond the peripheral plane of vertical plate 134. As such, when upper portion 130 is approximated with lower portion 110, vertical plate 114 of lower portion 110 may be positioned to slide adjacent to vertical plate 134 of upper portion 130 to provide the necessary force to push ball bearing 135 into housing 133. Further approximation of upper portion 130 and lower portion 110 results in opening 136 at least partially aligning itself with opening 116. When these two openings are aligned, or at least partially aligned, the biasing force of spring 138 may cause ball bearing 135 to extend through opening 116, thereby engaging upper portion 130 with lower portion 110. This can best be seen from the cross-sectional view of FIG. 8, which shows ball bearing 135 biased outwards through opening 136 and opening 116.

An alternative resilient protruding member is shown in the embodiment depicted in FIG. 9. FIG. 9 shows a spring-loaded pin 335 serving a substantially similar function to that of ball bearing 135 in FIG. 8. Once again, pin 335 is biased through opening 316 to engage the upper and lower portions of the device with one another. Pin 335 may include flanges 339 to prevent pin 335 from fully exiting housing 333. In the embodiment depicted in FIG. 8, the shape of ball bearing 135 is such that it cannot fully exit opening 116, and therefore similar flanges are not needed.

With reference again to FIGS. 2A, 2B, 3, and the cross-sectional view of FIG. 8, when a shearing or separation force is applied between the upper and lower portions of the device, ball bearing 135 may be forced out of opening 116, thereby allowing upper portion 130 to be disengaged from lower portion 110. In other words, the ball bearing 135 may be configured to automatically withdraw from opening 116 after a threshold separation force has been applied to the hinge device 100. Hinge device 100 is therefore resettable such that it can be reused to lift and lower a vehicle hood on a plurality of instances. When such a hinge device is connected with a vehicle hood, this allows the hood to be raised in accordance with desired safety specifications. It should be understood that the threshold separation force required to disengage the two portions of the device may be selectively altered as desired by varying, for example, the spring or other biasing force on the protruding member, the size and shape of the protruding member, and the dimensions and other characteristics of the opening with which the protruding member engages.

In some embodiments, the upper hinge portion 130 may include a collar 140. Collar 140 is configured to receive vertical plate 114 when the upper hinge portion 130 is engaged with the lower hinge portion 110, thereby helping to stabilize the engaged portions by, for example, preventing significant lateral movement between the parts. A collar 140 may also be used to guide the portions of the device together in a desired manner in some embodiments.

Figure 4:
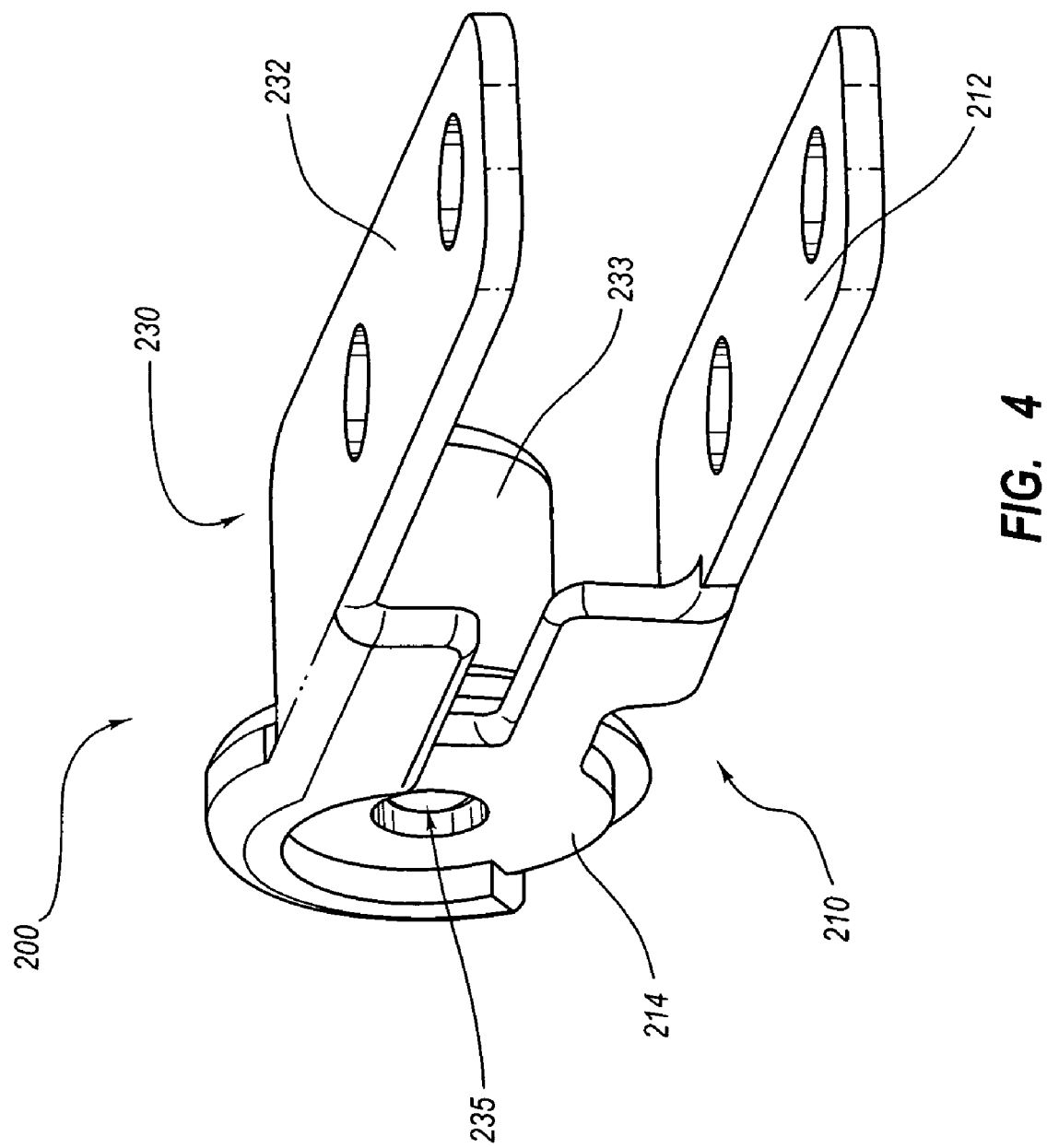
FIG. 4 is a perspective view of a second embodiment of a hinge device for use in a pedestrian protection system.

FIGS. 4-6 depict an alternative embodiment of a hinge device 200, in which the upper portion 230 is freely releasable from the lower portion 210. In other words, after a threshold separation force has been applied between the upper and lower portions of the device and the ball bearing 235 has been disengaged from the lower portion 210, the two portions of the device are no longer connected at all.

Hinge device 200 is otherwise similar to hinge device 100. The lower portion 210 of hinge device 200, like hinge device 100, includes a horizontal plate 212 and a vertical plate 214. Likewise, the upper portion 230 includes a horizontal plate 232. Upper portion 230 also includes a housing 233, which may be configured to house a resilient protruding member, such as ball bearing 235. Ball bearing 235 may operate and be formed in accordance with the principles discussed above in connection with ball bearing 135, or any of the other resilient protruding members discussed herein.

FIG. 7 depicts hinge device 200 used in connection with a hood guide 50. Hood guide 50 allows hinge device 200 to be used without a connecting portion that connects the upper and lower portions of the device together. Hood guide 50 includes a guide sleeve 52 with a stop pin 53 fixedly attached thereto. A guide bracket 54 having a guide slot 55 is attached to the hood 20. Stop pin 53 is slidably received within guide slot 55. Hood guide 50 may thereby allow for a predetermined separation distance between the components of a hinge device upon deployment according to, for example, the length of guide slot 55. Hood guide 50 may also be used to provide a guide for resetting the hinge device 200, if desired.

As previously mentioned, various embodiments of the invention described herein may be used in conjunction with an actuator configured to lift a vehicle hood. Such actuators are well-known in the art. Most such devices are configured to sense the collision of a vehicle with an obstacle using a collision sensor. Other sensors may also be used, such as sensors designed specifically to detect the presence of a pedestrian in front of the vehicle. Upon receipt of a signal from one or more such sensors, a force is provided by the actuator to lift a portion—typically the rear end closest to the windshield—of the hood so as to provide a gap between the hood and the engine compartment to give the hood additional room to deform and thereby absorb collision energy. In some actuators, a control unit may be provided which is operatively connected with the sensor. The control unit may be used to actuate a hood lifting mechanism which may extend, expand, spring, rotate, pivot, or otherwise provide the necessary force to lift the hood. In some exemplary actuators, a cylinder or piston oriented vertically between the hood and frame, body, or engine block of a vehicle may be employed to provide the lifting force.

One example of an actuator which may be suitable for use in connection with particular embodiments of the present invention is the gas spring actuator described in detail in PCT Patent Application No. PCT/SE2004/000599 published as International Publication No. WO 2004/094204 and titled "A Safety Device." This reference is hereby incorporated by reference in its entirety. Other examples of such actuators can be found in U.S. Pat. No. 6,907,817 titled "Linear Actuator," which is also hereby incorporated by reference in its entirety. Linear actuators typically include a power supply, a fluid, a housing, and a piston. The fluid used may be a liquid, such as a hydraulic fluid, or a gas, such as air. The power supply may be a pump, motor, mechanical lever, or other such mechanism for introducing pressure and force into the fluid. In some actuators, the power supply may pressurize the fluid by adding fluid from a reservoir to a closed system. Alternatively, the power supply may generate additional fluid or excite fluid currently in a closed system. The actuator is typically configured such that pressure applied to fluid within the housing causes the piston to extend or retract, thereby providing a force that can be used to lift a vehicle hood. Telescoping pistons, which have a plurality of stages, may also be used, as described in the aforementioned U.S. Patent reference. In telescoping piston actuators, the stages may be sized and configured to slide within each other like a telescope. Telescoping stages utilize space more efficiently and may allow for a stroke which is longer than the housing of the piston. Other telescoping pistons are described in detail in U.S. patent application Ser. No. 11/127,665, filed on May 11, 2005 and titled "TELESCOPING PYROTECHNIC SAFETY DEVICE." This reference is also hereby incorporated by reference in its entirety.

Figure 10:
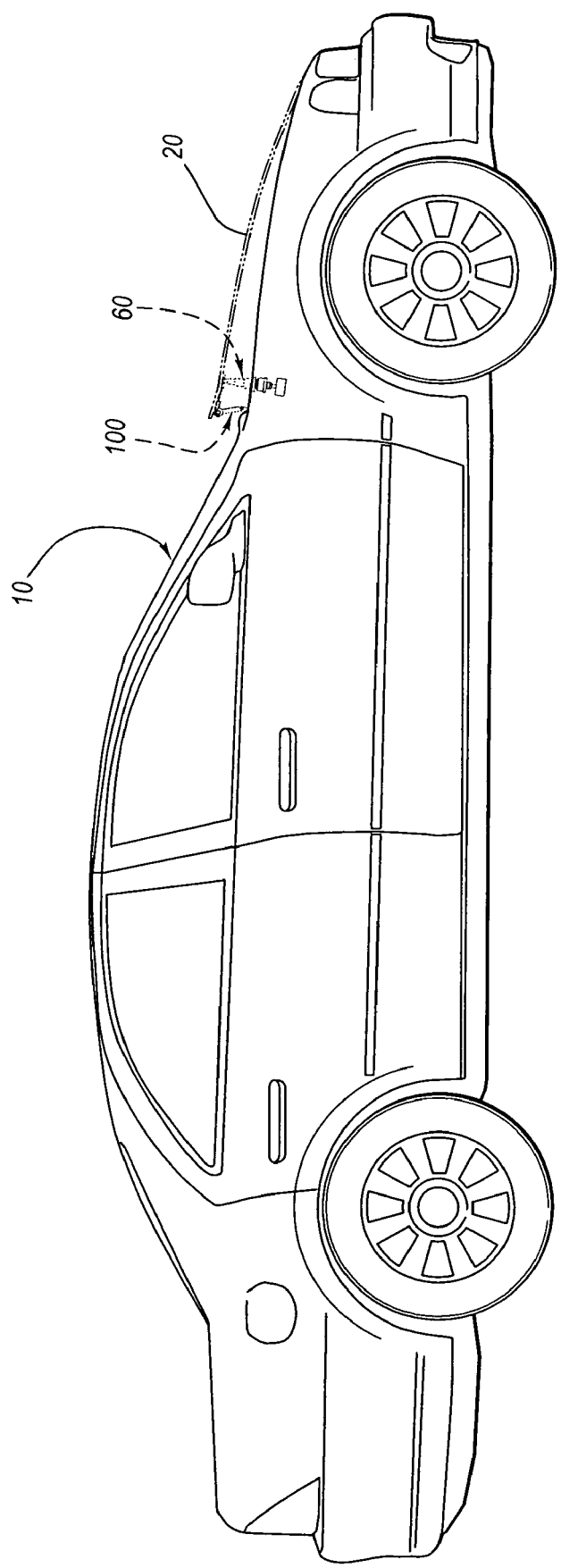
FIG. 10 depicts a vehicle having a telescoping actuator used in connection with an embodiment of a hinge device to lift the vehicle's hood.

FIG. 10 illustrates a hinge device 100 operating in conjunction with a telescoping piston actuator 60. Actuator 60 is connected with the hood 20 and is configured to lift the rear portion (adjacent windshield 10) of the hood 20. FIG. 10 depicts hood 20 in a raised position following deployment of actuator 60. Actuator 60 may be configured to not only raise the hood 20 upon receipt of a signal indicative of a potential pedestrian collision, but also, when used in conjunction with any of several embodiments of the hinge device disclosed herein, to lower the hood and reset the hinge device 100 for subsequent reuse. This may be useful, for example, if and when the actuator 60 deploys inadvertently.

Each of the resilient protruding members described herein, including ball bearing 135 and spring-loaded pin 335, are examples of means for releasably engaging an upper hinge portion with a lower hinge portion. Connecting portion 120 is an example of a means for hingedly connecting an upper hinge portion with a lower hinge portion.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. § 112 ¶6.

The invention claimed is:

1. A hinge device for use in a hood lifting system for pedestrian protection, comprising:
    an upper hinge portion configured to be connected with a vehicle hood; and
    a lower hinge portion, wherein the upper hinge portion is configured to releasably engage the lower hinge portion such that the upper hinge portion can disengage from the lower hinge portion and lift the vehicle hood upon a threshold separation force being applied to the hinge device,
    wherein one of the upper hinge portion and the lower hinge portion comprises an opening, and wherein the other of the upper hinge portion and the lower hinge portion comprises a resilient protruding member configured to extend into the opening and thereby engage the upper hinge portion with the lower hinge portion.

2. The hinge device of claim 1, wherein the hinge device is resettable such that, upon being disengaged from the lower hinge portion, the upper hinge portion can be re-engaged with the lower hinge portion to allow the hinge device to be reused to lift and lower the vehicle hood on a plurality of instances.

3. The hinge device of claim 1, further comprising a hinged connecting portion configured to connect the upper hinge portion with the lower hinge portion.

4. The hinge device of claim 1, wherein the upper hinge portion is freely releasable from the lower hinge portion.

5. The hinge device of claim 1, wherein the resilient protruding member comprises a ball bearing.

6. The hinge device of claim 1, wherein the resilient protruding member is spring-loaded.

7. The hinge device of claim 6, wherein the resilient protruding member comprises a pin.

8. The hinge device of claim 1, wherein the opening extends all the way through a piece of the lower hinge portion.

9. The hinge device of claim 1, wherein the resilient protruding member is configured to automatically withdraw from the opening after the threshold separation force has been applied to the hinge device.

10. The hinge device of claim 1, wherein the lower hinge portion comprises a plate, wherein the upper hinge portion comprises a collar, and wherein the collar is configured to receive the plate when the upper hinge portion is engaged with the lower hinge portion.

11. A hinge device for use in a hood lifting system for pedestrian protection, comprising:
    an upper hinge portion configured to be connected with a vehicle hood;
    a lower hinge portion configured to be connected with a vehicle body;
    a resilient protruding member; and an opening in the hinge device, wherein the resilient protruding member is configured to extend into the opening and thereby engage the upper hinge portion with the lower hinge portion, wherein the resilient protruding member is configured to releasably engage the opening such that the upper hinge portion can disengage from the lower hinge portion and lift the vehicle hood upon a threshold separation force being applied to the hinge device, and wherein, upon being disengaged from the opening, the resilient protruding member can be re-engaged with the opening to allow the hinge device to be reused to lift and lower the vehicle hood on a plurality of instances.

12. The hinge device of claim 11, further comprising a hinged connecting portion configured to connect the upper hinge portion with the lower hinge portion.

13. The hinge device of claim 11, wherein the resilient protruding member is connected to the upper hinge portion, and wherein the opening is formed in the lower hinge portion.

14. The hinge device of claim 11, wherein the upper hinge portion is freely releasable from the lower hinge portion.

15. A hinge device for use in a hood lifting system for pedestrian protection, comprising:

an upper hinge portion configured to be connected with a vehicle hood;

a lower hinge portion; and means for releasably engaging the upper hinge portion with the lower hinge portion, wherein the means for releasably engaging allows the upper hinge portion to disengage from the lower hinge portion and lift the vehicle hood upon a threshold separation force being applied between the upper hinge portion and the lower hinge portion.

16. The hinge device of claim 15, wherein the means for releasably engaging the upper hinge portion with the lower hinge portion comprises a spring-loaded pin.

17. The hinge device of claim 16, wherein the means for releasably engaging the upper hinge portion with the lower hinge portion further comprises an opening in the hinge device configured to receive the spring-loaded pin.

18. The hinge device of claim 15, further comprising means for hingedly connecting the upper hinge portion with the lower hinge portion.

* * * * *

UNITED STATES PATENT AND TRADEMARK OFFICE
CERTIFICATE OF CORRECTION

PATENT NO.        : 7,597,166 B2                                              Page 1 of 1
APPLICATION NO. : 11/407481
DATED             : October 6, 2009
INVENTOR(S)       : Brent Parks It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Twenty-eighth Day of September, 2010

David J. Kappos
*Director of the United States Patent and Trademark Office*